United States Patent
Kaliteevskiy et al.

(10) Patent No.: US 11,290,192 B2
(45) Date of Patent: Mar. 29, 2022

(54) QUANTUM COMMUNICATION METHODS AND SYSTEMS FOR MITIGATING THE DETECTOR DEAD TIME OF PHOTON DETECTORS

(71) Applicant: CORNING INCORPORATED, Corning, NY (US)

(72) Inventors: Nikolay Alekseyevich Kaliteevskiy, Saint-Petersburg (RU); Michal Mlejnek, Big Flats, NY (US); Daniel Aloysius Nolan, Corning, NY (US)

(73) Assignee: Corning Incorporated

( * ) Notice: Subject to any disclaimer, the term of this patent is extended or adjusted under 35 U.S.C. 154(b) by 0 days.

(21) Appl. No.: 16/967,291

(22) PCT Filed: Feb. 8, 2019

(86) PCT No.: PCT/US2019/017319
§ 371 (c)(1),
(2) Date: Aug. 4, 2020

(87) PCT Pub. No.: WO2019/160770
PCT Pub. Date: Aug. 22, 2019

(65) Prior Publication Data
US 2021/0028864 A1 Jan. 28, 2021

Related U.S. Application Data

(60) Provisional application No. 62/631,129, filed on Feb. 15, 2018.

(51) Int. Cl.
*H04B 10/70* (2013.01)
*H04B 10/25* (2013.01)

(52) U.S. Cl.
CPC .............. *H04B 10/70* (2013.01); *H04B 10/25* (2013.01)

(58) Field of Classification Search
CPC ........ H04B 10/25; H04B 10/70; H04L 9/0858
(Continued)

(56) References Cited

U.S. PATENT DOCUMENTS

| 7,019,875 | B2 | 3/2006 | Pittman et al. |
| 7,502,476 | B1 | 3/2009 | Trifonov et al. |

(Continued)

FOREIGN PATENT DOCUMENTS

| WO | 2015/050623 A2 | 4/2015 |
| WO | 2016/204847 A2 | 12/2016 |

OTHER PUBLICATIONS

Castelletto et al., "Reduced Deadtime and Higher Rate Photon-Counting Detection using a Multiplexed Detector Array", Arxiv. Org, Cornell University Library, Jan. 16, 2006, XP080225287.
(Continued)

*Primary Examiner* — Dalzid E Singh
(74) *Attorney, Agent, or Firm* — Svetlana Z. Short

(57) ABSTRACT

A quantum key generation system intended to mitigate the effect of the dead time of the photon detectors, the system including a photon generator, a photon pathway, a channel switch, and a photon detector unit. The photon pathway optically couples the photon generator and the channel switch. The channel switch is disposed between and optically coupled to the photon pathway and the photon detector unit. The photon detector unit includes a plurality of photon detectors and a plurality of detector unit sub-channels. Each detector unit sub-channel of the plurality of detector unit sub-channels optically couples the channel switch with an individual photon detector of the plurality of photon detectors. The channel switch is actuatable between a plurality of optical engagement positions. Further, each optical engagement position of the channel switch optically couples the photon pathway with a photon detector of the plurality of (Continued)

photon detectors. A plurality of quantum memories may be respectively placed between the switch and the plurality of photon detectors.

20 Claims, 3 Drawing Sheets

(58) Field of Classification Search
USPC .......................................................... 380/256
See application file for complete search history.

(56) References Cited

U.S. PATENT DOCUMENTS

| | | | |
|---|---|---|---|
| 8,238,556 B2* | 8/2012 | Yuan | H04L 9/0858 380/263 |
| 9,313,180 B1* | 4/2016 | Gray | H04L 63/0435 |
| 9,659,651 B1 | 5/2017 | Aitken et al. | |
| 10,600,482 B2* | 3/2020 | Kaczmarek | G06N 10/00 |
| 2008/0156993 A1 | 7/2008 | Weinberg et al. | |
| 2010/0034390 A1 | 2/2010 | Yamamoto et al. | |
| 2012/0050834 A1* | 3/2012 | Harrison | G06N 10/00 359/107 |
| 2012/0063596 A1* | 3/2012 | Brodsky | H04L 9/0858 380/256 |
| 2015/0249537 A1* | 9/2015 | Wabnig | H04B 10/70 380/256 |
| 2017/0163415 A1* | 6/2017 | Gray | H04L 9/0861 |
| 2020/0007242 A1* | 1/2020 | Li | H04B 10/2513 |

OTHER PUBLICATIONS

Eisaman et al., "Invited Review Article: Single-photon sources and detectors," Rev. Sci. Instr. 82, 071101 (2011).

Eraerds et al., "Quantum key distribution and 1 Gbps data encryption over a single fibre", New Journal of Physics 12 (2010).

ID Quantique SA (IDQ)—Swiss Quantum Security, Easyfairs Group, available online at <https://web.archive.org/web/20180514182415/http://www.easyfairs.com/events_216/ictexpo-2015_63499/ictexpo-2015_63500/exhibitors-products_63550/exhibitor-catalogue_63553/stand/541848/>, 2018, 29 pages.

International Search Report and Written Opinion of the International Searching Authority; PCT/US2019/017319; dated May 16, 2019; 15 Pages; European Patent Office.

Liu et al., "Reduced effect of single-photon-detector deadtime using a switchable detector array in an orbital-angular-momentum (OAM) encoded quantum system", 2017 Conference on Lasers and Electro-Optics (cleo). the Optical Society, May 14, 2017, pp. 1-2.

Polyakov et al., "Improved multiplexed infrared detectors for high-rate single-photon detection", Lasers and Electro-Optics, 2009 and 2009 Conference on Quantum Electronics and Laser Science Conference, Jun. 2, 2009, pp. 1-2.

Schettini et al., "Implementing a Multiplexed System of Detectors for Higher Photon Counting Rates", IEEE Journal of Selected Topics in Quantum Electronics, vol. 13, No. 4, Jul. 1, 2007, pp. 978-983.

* cited by examiner

QUANTUM COMMUNICATION METHODS AND SYSTEMS FOR MITIGATING THE DETECTOR DEAD TIME OF PHOTON DETECTORS

CROSS-REFERENCE TO RELATED APPLICATION

This application claims the benefit of priority under 35 U.S.C. § 371 of International Application No. PCT/US2019/017319, filed on Feb. 8, 2019, which claims the benefit of priority of U.S. Provisional Application Ser. No. 62/631,129 filed on Feb. 15, 2018 the contents of which are relied upon and incorporated herein by reference in their entirety.

BACKGROUND

The present disclosure relates to quantum communication systems having photon detector units. More specifically, the present disclosure relates to quantum communication systems that include a photon detector unit having a plurality of photon detectors and relates to methods and systems of mitigating the detector dead time of the photon detectors.

BRIEF SUMMARY

According to the subject matter of the present disclosure a quantum key generation system includes a photon generator, a photon pathway, a channel switch, and a photon detector unit. The photon pathway optically couples the photon generator and the channel switch. The channel switch is disposed between and optically coupled to the photon pathway and the photon detector unit. The photon detector unit includes a plurality of photon detectors and a plurality of detector unit sub-channels. Each detector unit sub-channel of the plurality of detector unit sub-channels optically couples the channel switch with an individual photon detector of the plurality of photon detectors. The channel switch is actuatable between a plurality of optical engagement positions. Further, each optical engagement position of the channel switch optically couples the photon pathway with a photon detector of the plurality of photon detectors.

In accordance with one embodiment of the present disclosure, a method of communicating information includes generating a photon pulse sequence having a plurality of photon pulses using a photon generator. The photon generator is optically coupled to a channel switch by a photon pathway. The channel switch is disposed between and optically coupled to the photon pathway and a photon detector unit, the photon detector unit having a plurality of photon detectors and a plurality of detector unit sub-channels. Each detector unit sub-channel of the plurality of detector unit sub-channels optically couples the channel switch with an individual photon detector of the plurality of photon detectors. The channel switch is actuatable between a plurality of optical engagement positions. Further, each optical engagement position of the channel switch optically couples the photon pathway with a detector unit sub-channel of the plurality of detector unit sub-channels. The method further includes switching the optical engagement position of the channel switch such that temporally adjacent photon pulses of the photon pulse sequence are output into different detector unit sub-channels of the plurality of detector unit sub-channels.

In accordance with yet another embodiment of the present disclosure, a method of communicating information includes generating a photon pulse sequence using a photon generator. The photon pulse sequence includes a plurality of photon pulse sub-sequences each having a plurality of photon pulses, the plurality of photon pulses each having quantum bit information. The photon generator is optically coupled to a channel switch by a photon pathway. The channel switch is disposed between and optically coupled to the photon pathway and a photon detector unit, the photon detector unit including a plurality of photon detectors, a plurality of detector unit sub-channels, and a plurality of quantum memories. The channel switch is actuatable between a plurality of optical engagement positions. Further, the channel switch is positioned in optical engagement with a first detector unit sub-channel such that a first photon pulse sub-sequence including a first plurality of photon pulses each having a pulse sequence period is absorbed by a first quantum memory and the quantum bit information of each of the first plurality of photon pulses is thereafter released by the first quantum memory at a quantum memory period and received by a first photon detector. The method further includes switching the channel switch into optical engagement with a second detector unit sub-channel such that a second photon pulse sub-sequence including a second plurality of photons pulses having the pulse sequence period is absorbed by a second quantum memory and the quantum bit information of each of the second plurality of photon pulses is thereafter released by the second quantum memory at the quantum memory period and received by a second photon detector. Moreover, the quantum memory period is longer than the pulse sequence period.

Although the concepts of the present disclosure are described herein with primary reference to quantum key generation, it is contemplated that the concepts will enjoy applicability to any quantum information communication.

BRIEF DESCRIPTION OF THE SEVERAL VIEWS OF THE DRAWINGS

The following detailed description of specific embodiments of the present disclosure can be best understood when read in conjunction with the following drawings, where like structure is indicated with like reference numerals and in which.

DETAILED DESCRIPTION

Figure 1:
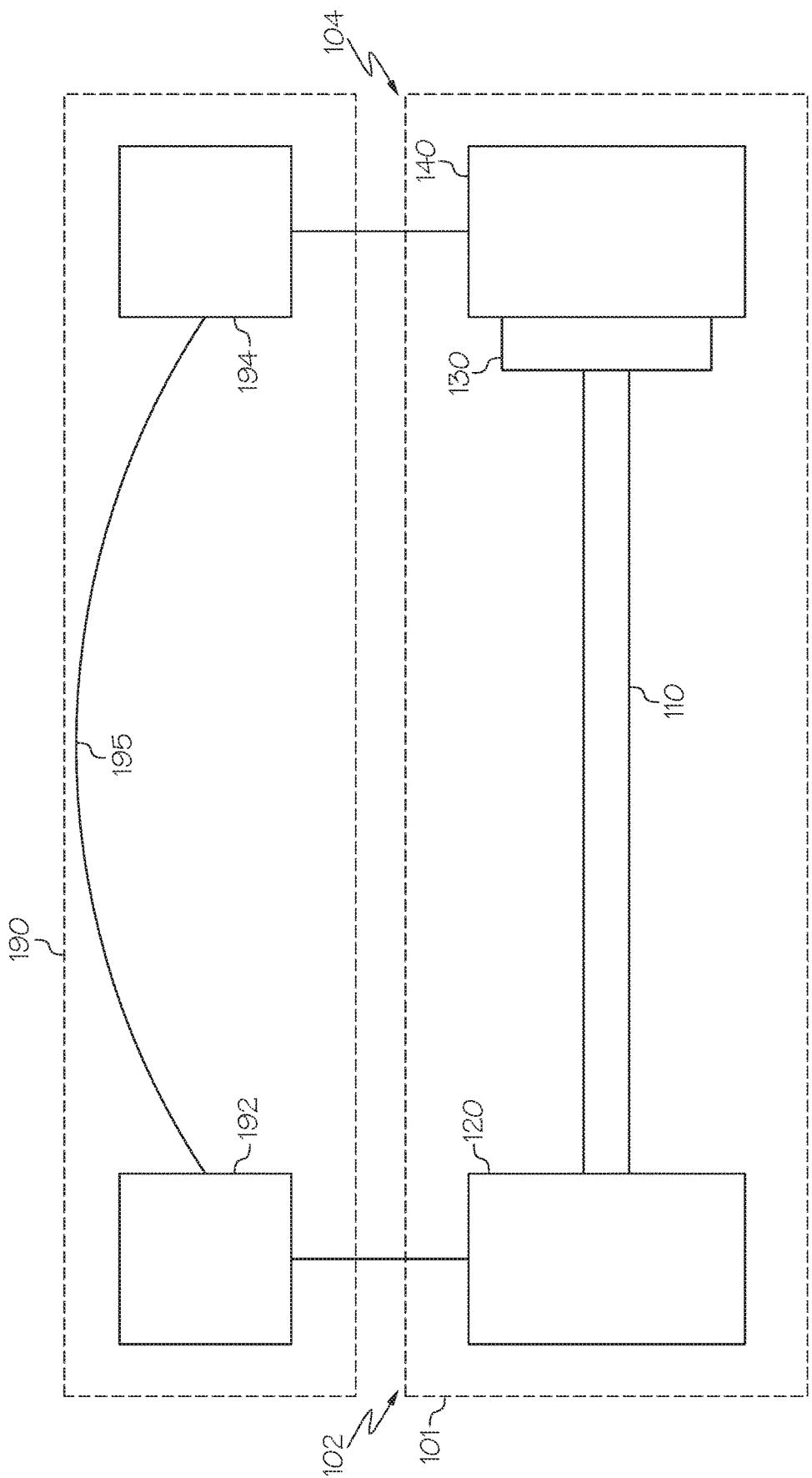
FIG. 1 schematically depicts a quantum communications system including a quantum key generation system and a communications network, according to one or more embodiments shown and described herein.

Referring now to FIG. 1, a quantum communications system 100 comprising a quantum key generation system 101 is schematically depicted. As described in more detail herein, the quantum key generation system 101 is structurally configured to generate a quantum cryptographic key, which may be used to encode and/or decode encrypted messages. The quantum key generation system 101 includes a photon generator 120, a photon detector unit 140, a channel switch 130, and a photon pathway 110. The photon pathway 110 optically couples the photon generator 120 and the channel switch 130. Further, the channel switch 130 is disposed between and optically coupled to the photon pathway 110 and the photon detector unit 140, thus optically coupling the photon generator 120 and the photon detector unit 140. As used herein, "optically coupled" refers to two or more components arranged such that photons pulses and/or quantum information may be transferred therebetween. The channel switch 130 comprises an optical switch, for example, any known or yet to be developed optical switch. Further, the photon generator 120 is positioned at an output end 102 (often referred to as "Alice") of the quantum communications system 100 and the photon detector unit 140 is positioned at a receiving end 104 (often referred to as "Bob") of the quantum communications system 100.

The photon pathway 110 may comprise an optical waveguide, such as an optical fiber comprising a core and a cladding surrounding the core, a planar waveguide, or the like. Alternatively, the photon pathway 110 may comprise a free space pathway, which may be located in a vacuum or in an atmosphere. When the photon pathway 110 comprises a free space pathway, no intervening optical components are positioned between the photon generator 120 and the channel switch 130 along the photon pathway 110. In some embodiments, the photon pathway 110 may include one or more optical components such as lenses (e.g., focusing lenses, collimating lenses, atmosphere, etc.), mirrors, or the like, used in combination with one or more waveguides or used without any waveguides such that portions of the photon pathway 110 are located in a vacuum or in an atmosphere.

Referring still to FIG. 1, the photon generator 120 is structurally configured to generate one or more photon pulses, for example, a photon pulse sequence comprising a plurality of photon pulses, which may comprise any single wavelength k, for example, from about 800 nm to about 1800 nm, such as about 800 nm, 1310 nm, 1550 nm, or the like. However, it should be understood that any wavelength may be used. As used herein, the photon pulses sequence may be described as comprising a plurality of photon pulse sub-sequences, each having pluralities of photon pulses. In operation, photons pulses output by the photon generator 120 may comprise quantum bit information. As used herein, "quantum bit information" refers to a photon property that may be used to form a quantum communication, for example, a quantum key. Example quantum information bits include a measurable quantum property of the photon, for example a polarization, such as a linear polarization, a circular polarization, an elliptical polarization, or any other polarization, translational momentum, orbital angular momentum, phase or the like.

In some embodiments, the quantum key generation system 101 may be a non-entanglement based system in which the photon pulses comprise non-entangled photon pulses. For examples, the photon generator 120 may comprise a laser source configured to generate non-entangled photon pulses, for example, any narrow linewidth laser, such as a laser than generates short pulses, a continuous wave laser that can be modulated such that pulses are generated, or the like. In these embodiments, the quantum key generation system 101 may perform any known or yet-to-be developed entangled based quantum communication protocols, such as, SARG04 protocol, COW protocol, MDI (measurement device independent) QKD protocol, BB84 protocol, the decoy state versions of each of these protocols, or the like.

In some embodiments, the quantum key generation system 101 may be an entanglement based system in which the photon pulses comprise entangled photon pulses and the photon generator 120 is an entangled photon generator structurally configured to generate photon pulses comprising two or more entangled photons, such as entangled photon pairs. As one example, the photon generator 120 may comprise a laser source optically coupled to one or more non-linear crystals and may be configured to generate entangled photon pairs using a parametric down conversion process. As another example, the photon generator 120 may generate an entangled photon pair using a four-wave mixing process, or any method or process of generating a photon pulse that may comprise one or more entangled photon pairs. In these embodiments, the quantum key generation system 101 may perform any known or yet-to-be developed entanglement based quantum communication protocol, such as the E91 protocol, the DLCZ protocol, or the like.

Moreover, while the embodiments described herein refer to a single photon generator 120 and a single photon detector unit 140, it should be understood that the methods and systems described herein are applicable to embodiments comprising multiple photon generators 120 and multiple photon detector units 140. For example, entanglement based systems may include one or more photon detecting components at the receiving end 104 (e.g., "Bob"), such as the photon detector unit 140, and also include one or more photon detecting components at the output end 102 (e.g., "Alice"), which may be configured to receive and measure the quantum bit information of one of the photon pulses of an entangled photon pair.

Figure 3:
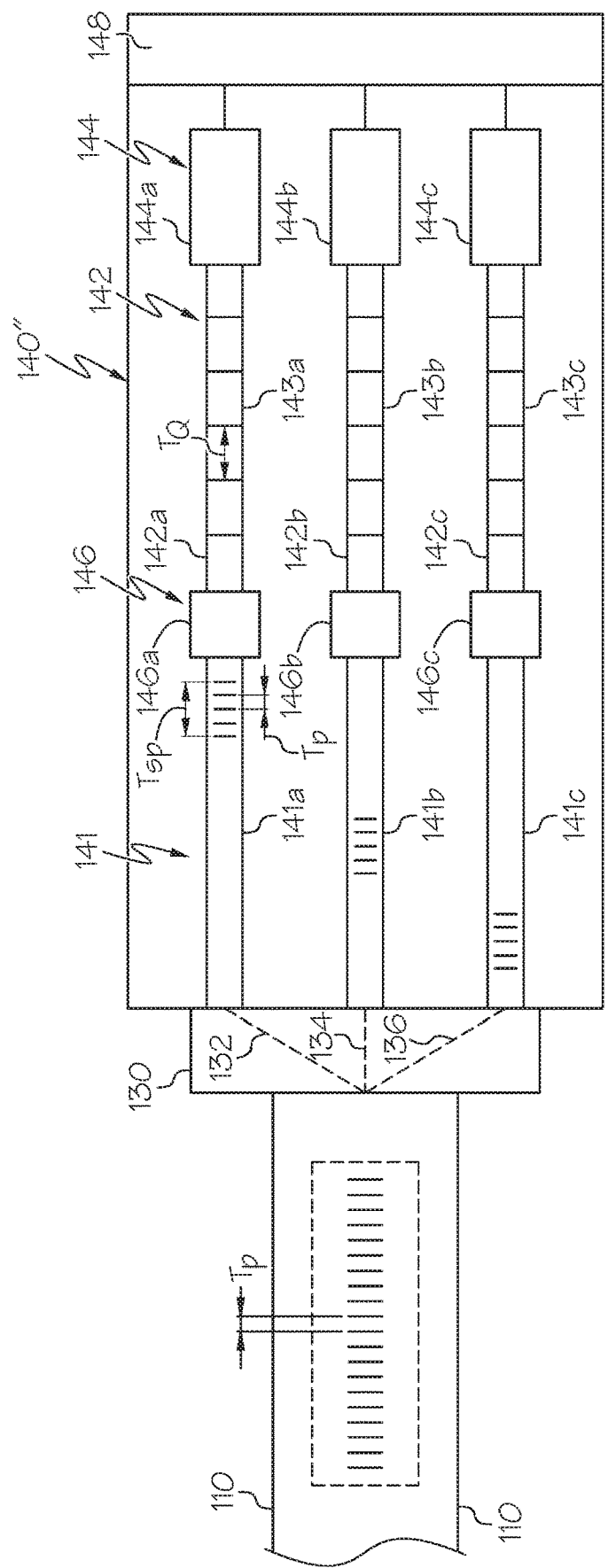
FIG. 3 schematically depicts a quantum bit pathway, a channel switch, and a photon detector unit that includes a plurality of photon detectors, a plurality of detector unit sub-channels, and a plurality of quantum memories, according to one or more embodiments shown and described herein.

In operation, the quantum communications system 100 is structurally configured to communicate quantum information between separate locations (e.g., the output end 102 and the receiving end 104). For example, the photon generator 120 may output one or more photon pulses comprising quantum bit information and the photon detector unit 140 may receive this quantum bit information, for example upon receipt of the photon pulses output by the photon generator 120 or upon receipt of photon pulses having the quantum bit information of the photon pulses output by the photon generator 120 (e.g., embodiments having one or more quantum memories 146, as depicted in FIG. 3). The quantum bit information may be used to form a cryptographic key (e.g., a cryptographic quantum key) that may be used to encode and/or decode encrypted messages. For example, the quantum communications system 100 may further comprise a communications network 190 that may be used to transfer encrypted messages that may be encoded and/or decoded using cryptographic keys formed by the quantum key generation system 101.

As depicted in FIG. 1, the communications network 190 includes a signal generator 192, a signal receiver 194, and a signal channel 195 that extends between and communicatively couples the signal generator 192 and the signal receiver 194. The signal generator 192 may be positioned at the output end 102 and the signal receiver 194 may be positioned at the receiving end 104. Further, the signal receiver 194 is communicatively coupled to the photon detector unit 140, communicatively coupling the quantum key generation system 101 to the communications network 190. In operation, the signal generator 192 may output a signal comprising one or more signal bits, which may comprise portions of an encrypted message, and the signal receiver 194 may compare the one or more signal bits with the quantum bit information upon receipt of the signal, for example, to decode the encrypted message using a cryptographic key formed using quantum key generation system 101 (e.g., using the quantum bit information).

The efficiency of forming a cryptographic key using the quantum key generation system 101 may diminish due to a variety of factors, such as photon loss during transmission, detector dead time, encoding apparatus imperfections, stray photons, detector dark count, afterpulsing, Raman noise, chromatic dispersion, or the like. These factors may increase a quantum bit error ratio (QBER) and decrease a secure key rate (SKR) of the quantum key generation system 101. As used herein, "secure key rate" refers to the rate of formation of the cryptographic key and "quantum bit error ratio" refers to a ratio of the number of photon pulse time slots in which the photon detector unit 140 does not perform a measurement or in which the photon detector unit 140 performs a measurement in error, to the total number of photon pulse time slots over a period of time. A photon pulse time slot refers to a period of time in which the photon generator 120 attempts to generate a photon pulse. In some attempts, the photon generator 120 fails to generate a photon pulse. These failed attempts are referred to as empty photon pulses, which may increase the QBER and decrease SKR. In other attempts, the photon generator 120 generates a photon pulse. However, when the photon generator 120 generates a photon pulse other factors may increase QBER and decrease SKR, such as detector dead time. As used herein "detector dead time" refers to a recovery period of an individual photon detector between detection events, during which the photon detector cannot detect other photon pulses. The embodiments described herein provide methods and systems to mitigate detector dead time, thereby reducing QBER and increasing SKR.

Figure 2:
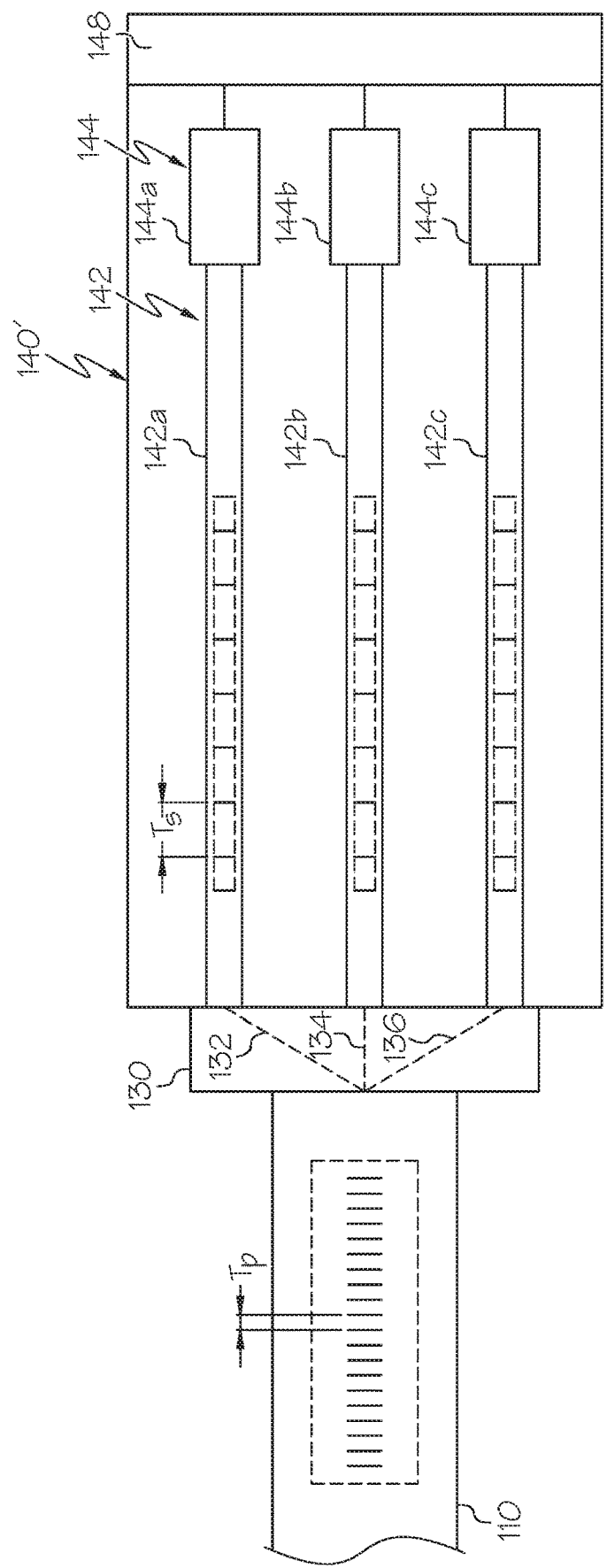
FIG. 2 schematically depicts a quantum bit pathway, a channel switch, and photon detector unit that includes a plurality of photon detectors and a plurality of detector unit sub-channels, according to one or more embodiments shown and described herein.

Referring now to FIGS. 2 and 3, embodiments of the photon detector unit 140 are depicted in more detail. For example, FIG. 2, depicts a photon detector unit 140' comprising a plurality of photon detectors 144, a plurality of detector unit sub-channels 142, and a detector unit controller 148 and FIG. 3 depicts a photon detector unit 140" comprising the plurality of photon detectors 144, the plurality of detector unit sub-channels 142, a plurality of quantum memories 146, and the detector unit controller 148. In each of these embodiments, the plurality of detector unit sub-channels 142 optically couple the channel switch 130 to each of the plurality of photon detectors 144 such that the plurality of photon detectors 144 receive the photon pulses received by the channel switch 130 or receive photon pulses having the quantum bit information of the photon pulses received by the channel switch 130. In operation, the channel switch 130 may selectively optically couple the photon pathway 110 with individual detector unit sub-channels 142. For example, the channel switch 130 is actuatable between a plurality of optical engagement positions 132, 134, 136. Each optical engagement position of the channel switch 130 optically couples the photon pathway 110 with an individual detector unit sub-channel 142 and thereby with an individual photon detector 144 and in some embodiments (FIG. 3), with an individual quantum memory 146.

In some embodiments, the plurality of detector unit sub-channels 142 may comprise an optical waveguide, such as an optical fiber comprising a core and a cladding surrounding the core, a planar waveguide, or the like. Further, each of the detector unit sub-channels 142 may comprise the same optical length (i.e. core length). In some embodiments, the plurality of photon detectors 144 may comprise a single photon detector, for example, a superconducting nanowire single-photon detector, a carbon nanowire detector, an avalanche photodiode detector, a low dark count photodiode, or the like. In other embodiments, the plurality of photon detectors 144 may comprise a photon number resolving detector. However, it should be understood that the plurality of photon detectors 144 may comprise any photon detector. In operation, each photon detector 144 of the photon detector unit 140 is structurally configured to receive quantum bit information of a photon pulse output by the photon generator 120. Moreover, each photon detector 144 comprises a detector dead time between such measurements.

Referring still to FIGS. 2 and 3, the detector unit controller 148 may be positioned in the photon detector unit 140', 140" and communicatively coupled to the photon detectors 144, or may be a standalone component communicatively coupled to the photon detector unit 140', 140" and communicatively coupled to the photon detectors 144. The detector unit controller 148 may comprise a processor and control logic for controlling the photon detector unit 140, 140', 140". In some embodiments, the detector unit controller 148 may apply a randomly selected quantum basis to the measurement of photon pulses and the quantum bit information received by the photon detectors 144. Further, the detector unit controller 148 may provide clock timing, synchronization, and calibration to the photon detectors 144 and other functions necessary for the QKD operation, and may form the cryptographic key based on the quantum key information received by the photon detectors 144.

Referring now to FIG. 2 the photon detector unit 140' comprises a first detector unit sub-channel 142a extending between and optically coupling the channel switch 130 and a first photon detector 144a, a second detector unit sub-channel 142b extending between and optically coupling the channel switch 130 and a second photon detector 144b, and a third detector unit sub-channel 142c extending between and optically coupling the channel switch 130 and a third photon detector 144c. While three detector unit sub-channels 142 and three photon detectors 144 are depicted, it should be understood that any number of detector unit sub-channels 142 and photon detectors 144 are contemplated.

Referring now to FIG. 3, the photon detector unit 140" comprises the first detector unit sub-channel 142a, the second detector unit sub-channel 142b, and the third detector unit sub-channel 142c, as well as the first photon detector 144a, the second photon detector 144b, and the third photon detector 144c. Further, the photon detector unit 140" comprises a first quantum memory 146a optically coupled to and positioned between the channel switch 130 and the first photon detector 144a, a second quantum memory 146b optically coupled to and positioned between the channel switch 130 and the second photon detector 144b, and a third quantum memory 146c optically coupled to and extending between the channel switch 130 and the third photon detector 144c. While three detector unit sub-channels 142, three photon detectors 144, and three quantum memories 146 are depicted, it should be understood that any number of detector unit sub-channels 142, photon detectors 144, and quantum memories 146 are contemplated.

The quantum memories 146 of the photon detector unit 140" of FIG. 3 may comprise any known or yet-to-be developed quantum memory. While not intending to be limited by theory, each quantum memory 146 is structurally configured to, upon receipt of a photon pulse, absorb the photon pulse via a non-linear optical process thereby exciting an atomic ensemble state of the quantum memory 146 from a first energy state, such as a ground state, into a second energy state, such as a non-ground state, for example, an excited state. Then, after a period of time, the atomic ensemble state of the quantum memory 146 returns to the first energy state, and another photon pulse is released. As used herein, "atomic ensemble state" refers to the arrangement of energy states of the atoms that comprise the quantum memory 146. As a non-limiting example, in the first energy state, the electrons of the quantum memory 146 may be in a ground state and in the second energy state, some of those electrons may move into an excited state. Moreover, in some embodiments, the first energy state may have a lower total energy than the second energy state.

While not intending to be limited by theory, the photon pulse released by the quantum memory 146 may comprise the quantum bit information (e.g., the quantum properties) of the photon pulse received by the quantum memory 146, such as coherence properties. While still not intending to be limited by theory, the photon pulse released by the quantum memory 146 may be in the same quantum state as the photon pulse received by the quantum memory 146. As one non-limiting example, the plurality of quantum memories 146 may be an atomic frequency comb (AFC) or controlled reversible inhomogeneous broadening (CRIB), in which individual photon pulses may be stored and may be selectively released on-demand.

In some embodiments, each detector unit sub-channel 142 of the photon detector unit 140" may comprise an upstream segment 141 and a downstream segment 143. The upstream segment 141 optically couples the channel switch 130 to an individual quantum memory 146 and the downstream segment 143 optically couples an individual quantum memory 146 to an individual photon detector 144. For example, the first detector unit sub-channel 142a comprises a first upstream segment 141a extending between and optically coupling the channel switch 130 and the first quantum memory 146a and a first downstream segment 143a extending between and optically coupled the first quantum memory 146a and the first photon detector 144a, the second detector unit sub-channel 142b comprises a second upstream segment 141b extending between and optically coupling the channel switch 130 and the second quantum memory 146b and a second downstream segment 143b extending between and optically coupled the second quantum memory 146b and the second photon detector 144b, and the third detector unit sub-channel 142c comprises a third upstream segment 141c extending between and optically coupling the channel switch 130 and the third quantum memory 146c and a third downstream segment 143c extending between and optically coupled the third quantum memory 146c and the third photon detector 144c.

Referring again to FIGS. 2 and 3, the channel switch 130 is actuatable between a first optical engagement position 132, in which the channel switch 130 is optically engaged with the first detector unit sub-channel 142a, a second optical engagement position 134, in which the channel switch 130 is optically engaged with the second detector unit sub-channel 142b, and a third optical engagement position 136 in which the channel switch 130 is optically engagement with the third detector unit sub-channel 142c. While three optical engagement positions 132, 134, 136 are depicted, it should be understood that the channel switch 130 may comprise any number of optical engagement positions, for example, the channel switch 130 may comprise at least the same number of optical engagement positions as detector unit sub-channels 142 and photon detectors 144. In operation, the channel switch 130 may be switched between different optical engagement positions such that individual photon pulses are directed into different detector unit sub-channels 142. Thus, the different photon detectors 144 optically coupled to the different detector unit sub-channels 142 receive quantum bit information at a frequency that is lower than the frequency of the photon pulse sequence. As described in more detail below, when the frequency of the quantum bit information received is low enough that the period between quantum bit information measurements by an individual photon detector is greater than that individual photon detector's detector dead time, photon pulse loss due to detector dead time may be mitigated and in some embodiments, eliminated.

Referring again to FIGS. 1 and 2, a method of communicating quantum bit information while mitigating detector dead time includes generating a photon pulse sequence comprising a plurality of photon pulses using the photon generator 120 such that the plurality of photon pulses of the photon pulse sequence propagate from the photon generator 120 to the channel switch 130, for example, using the photon pathway 110. The photon pulse sequence comprises temporally adjacent photon pulses temporally spaced by a pulse spacing period $T_P$. The method further comprises switching the optical engagement position of the channel switch 130 such that temporally adjacent photon pulses of the photon pulse sequence are directed into different detector unit sub-channels 142 and the quantum bit information of the temporally adjacent photon pulses are received by different photon detectors 144.

For example, the channel switch 130 may be positioned in the first optical engagement position 132 such that a first photon pulse propagates from the photon pathway 110 into the first detector unit sub-channel 142a. The channel switch 130 may then be switched from the first optical engagement position 132 into the second optical engagement position 134 such that a second photon pulse, temporally adjacent to the first photon pulse, propagates from the photon pathway 110 into the second detector unit sub-channel 142b. Next, the channel switch may be switched from the second optical engagement position 134 into the third optical engagement position 136 such that a third photon pulse, temporally adjacent the second photon pulse, propagates from the photon pathway 110 into the third detector unit sub-channel 142c. Furthermore, the channel switch 130 may be switched from the third optical engagement position 136 back to the first optical engagement position 132 such that a fourth photon pulse, temporally adjacent to the third photon pulse, propagates from the photon pathway 110 into the first detector unit sub-channel 142a. Thus, the first photon pulse and the fourth photon pulse are now temporally adjacent in the first photon detector unit sub-channel and are temporally spaced by a sub-channel period Ts, which is greater than the pulse spacing period $T_P$ (i.e., greater than the period between the first photon pulse and the second photon pulse). By increasing the temporal spacing between adjacent photon pulses in the detector unit sub-channels 142, the period between measurements at each individual photon detector 144 may be increased to mitigate detector dead time of the photon detectors 144, for example, when the sub-channel period Ts is greater than the detector dead time of each photon detectors 144.

It should be understood that while three detector unit sub-channels 142 and three photon detectors 144 are depicted in FIG. 2, any number of detector unit sub-channels 142 and photon detectors 144 are contemplated. In particular, without intending to be limited by theory, to account for the detector dead time of the photon detectors 144, the photon detector unit 140' may comprise $N_D$ number of detector unit sub-channels 142 and $N_D$ number of photon detectors 144, where $N_D > \tau_{dead} \times T_P$, $\tau_{dead}$ comprises a detector dead time of each of the plurality of photon detectors 144, and $T_P$ comprises the pulse spacing period.

In embodiments comprising $N_D$ number of photon detectors 144 and detector unit sub-channels 142, the first detector unit sub-channel 142a receives the first photon pulse of the photon pulse sequence, the $N_D+1$ photon pulse of the photon pulse sequence, the $2N_D+1$ photon pulse of the photon pulse sequence, the $3N_D+1$ photon pulse of the photon pulse sequence, and so on, the second detector unit sub-channel 142b receives the second photon pulse of the photon pulse sequence, the $N_D+2$ photon pulse of the photon pulse sequence, the $2N_D+2$ photon pulse of the photon pulse sequence, the $3N_D+2$ photon pulse of the photon pulse sequence, and so on, the third detector unit sub-channel 142c receives the third photon pulse of the photon pulse sequence, the $N_D+3$ photon pulse of the photon pulse sequence, the $2N_D+3$ photon pulse of the photon pulse sequence, the $3N_D+3$ photon pulse of the photon pulse sequence, and so on, and the $N_D$ detector unit sub-channel receives the $N_D$ photon pulse of the photon pulse sequence, the $2N_D$ photon pulse of the photon pulse sequence, the $3N_D$ photon pulse of the photon pulse sequence, the $4N_D$ photon pulse of the photon pulse sequence, and so on. Further, as different photon detectors 144 receive and detect different portions of the photon pulse sequence, the detections (e.g., detected signals) may be combined and organized, via multiplexing or the like, using the plurality of photon detectors 144, the detector unit controller 148, or a combination thereof, to determine the original sequence sent by the photon generator 120 (e.g., sent by Alice) and thereby determine the quantum message sent by the photon generator 120, for example, the quantum cryptographic key.

In operation, the channel switch 130 switches from optical engagement with one detector unit sub-channel 142 into optical engagement with another detector unit sub-channel 142 in a switching period. In some embodiments, the switching period is less than the pulse spacing period $T_P$ such that temporally adjacent photon pulses of the photon pulse sequence can be directed into different detector unit sub-channels 142 without losing photon pulses due to the switching process. However, in other embodiments, the switching period may be greater than the pulse spacing period $T_P$ such that some of the photons pulses are lost during the switching period, for example, in embodiments having a short pulse spacing period and thus a high rate of photon pulses. In this case, the channel switch 130 may instead switch between optical engagement positions such that photon pulse sub-sequences of the photon pulse sequence are directed into different detector unit sub-channels 142. While some photon pulses may be lost during the switching period, most of the photons pulses of the photon pulse sequence will be directed into the plurality of detector unit sub-channels 142 as photon pulse sub-sequences.

However, temporally adjacent photon pulses of an individual photon pulse sub-sequence comprise the pulse spacing period $T_P$, which may be less than the detector dead time, causing photon pulse loss and increasing QBER due to the detector dead time. To mitigate loss due to the detector dead time in embodiments in which photon pulse sub-sequences are directed into individual detector unit sub-channels 142, the quantum memories 146 of the photon detector unit 140" (FIG. 3) may increase the period between temporally adjacent photon pulses of the photon pulse sub-sequences from the pulse spacing period $T_P$ to a quantum memory period $T_{QM}$, which is greater than the pulse spacing period $T_P$ and may be greater than the detector dead time of the photon detectors 144.

This method includes generating a photon pulse sequence using the photon generator 120 and switching the optical engagement position of the channel switch 130 such that photon pulse sub-sequences comprising pluralities of photon pulses temporally spaced by the pulse spacing period $T_P$ may be directed into different detector unit sub-channels 142 and absorbed by different quantum memories 146. In operation, each plurality of photon pulses of an individual photon pulse sub-sequence are absorbed by an individual quantum memory 146 and the quantum bit information of each plurality of photon pulses is thereafter released by the individual quantum memory 146 at the quantum memory period $T_{QM}$ such that the quantum bit information is received by photon detectors 144 at times spaced by the quantum memory period $T_{QM}$. Further, when the quantum memory period $T_{QM}$ is greater than the detector dead time of each of the plurality of photon detectors 144, the quantum bit information of the photon pulses are not lost due to detector dead time.

As one example, the channel switch 130 may be positioned in optical engagement with the first detector unit sub-channel 142a (e.g., the first optical engagement position 132) such that a first photon pulse sub-sequence comprising a first plurality of photon pulses each having the pulse sequence period $T_P$ is absorbed by the first quantum memory 146a and the quantum bit information of each of the first plurality of photon pulses is thereafter released by the first quantum memory 146a at the quantum memory period $T_{QM}$ and received by the first photon detector 144a such that measurements by the first photon detector 144a occur temporally spaced by the quantum memory period $T_{QM}$. Next, the channel switch 130 may be switched from the first optical engagement position 132 into the second optical engagement position 134 such that a second photon pulse sub-sequence comprising a second plurality of photons pulses having the pulse sequence period $T_P$ is absorbed by the second quantum memory 146b and the quantum bit information of each of the second plurality of photon pulses is thereafter released by the second quantum memory 146b at the quantum memory period $T_{QM}$ and received by the second photon detector 144b such that measurements by the second photon detector 144b occur temporally spaced by the quantum memory period $T_{QM}$.

Next, the channel switch 130 may be switched from the second optical engagement position 134 into the third optical engagement position 136 such that a third photon pulse sub-sequence comprising a third plurality of photons pulses having the pulse sequence period $T_P$ is absorbed by the third quantum memory 146c and the quantum bit information of each of the third plurality of photon pulses is thereafter released by the third quantum memory 146c at the quantum memory period $T_{QM}$ and received by the third photon detector 144c such that measurements by the third photon detector 144c occur temporally spaced by the quantum memory period $T_{QM}$. Furthermore, the channel switch 130 may be switched from the third optical engagement position 136 back to the first optical engagement position 132 such that a fourth photon pulse sub-sequence comprising a fourth plurality of photons pulses having the pulse sequence period $T_P$ is absorbed by the first quantum memory 146a and the quantum bit information of each of the first plurality of photon pulses is thereafter released by the first quantum memory 146a at a quantum memory period $T_{QM}$ and received by the first photon detector 144a such that measurements by the first photon detector 144a occur temporally spaced by the quantum memory period $T_{QM}$.

Further, as different photon detectors 144 receive and detect different portions of the photon pulse sequence, the detections (e.g., detected signals) may be combined and organized, via multiplexing or the like, using the plurality of photon detectors 144, the detector unit controller 148, or a combination thereof, to determine the original sequence sent by the photon generator 120 (e.g., sent by Alice) and thereby determine the quantum message, for example, the quantum cryptographic key sent by the photon generator 120. Moreover, it should be understood that this method may continue operating and may be used to communicate quantum bit information to the photon detector unit 140, for example, to form a quantum cryptographic key.

For the purposes of describing and defining the present inventive technology, it is noted that reference herein to a variable being a "function" of a parameter or another variable is not intended to denote that the variable is exclusively a function of the listed parameter or variable. Rather, reference herein to a variable that is a "function" of a listed parameter is intended to be open ended such that the variable may be a function of a single parameter or a plurality of parameters.

It is also noted that recitations herein of "at least one" component, element, etc., should not be used to create an inference that the alternative use of the articles "a" or "an" should be limited to a single component, element, etc.

It is noted that recitations herein of a component of the present disclosure being "configured" in a particular way, to embody a particular property, or function in a particular manner, are structural recitations, as opposed to recitations of intended use. More specifically, the references herein to the manner in which a component is "configured" denotes an existing physical condition of the component and, as such, is to be taken as a definite recitation of the structural characteristics of the component.

For the purposes of describing and defining the present inventive technology it is noted that the terms "substantially" and "about" are utilized herein to represent the inherent degree of uncertainty that may be attributed to any quantitative comparison, value, measurement, or other representation. The terms "substantially" and "about" are also utilized herein to represent the degree by which a quantitative representation may vary from a stated reference without resulting in a change in the basic function of the subject matter at issue.

Having described the subject matter of the present disclosure in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Further, it will be apparent that modifications and variations are possible without departing from the scope of the present disclosure, including, but not limited to, embodiments defined in the appended claims. More specifically, although some aspects of the present disclosure are identified herein as preferred or particularly advantageous, it is contemplated that the present disclosure is not necessarily limited to these aspects.

It is noted that one or more of the following claims utilize the term "wherein" as a transitional phrase. For the purposes of defining the present inventive technology, it is noted that this term is introduced in the claims as an open-ended transitional phrase that is used to introduce a recitation of a series of characteristics of the structure and should be interpreted in like manner as the more commonly used open-ended preamble term "comprising."

What is claimed is:

1. A quantum key generation system comprising:
a photon generator structured to generate a photon pulse sequence comprising a plurality of photon pulse subsequences each comprising a plurality of photon pulses, the plurality of photon pulses each comprising quantum bit information, a photon pathway, a channel switch, and a photon detector unit, wherein:
the photon pathway optically couples the photon generator and the channel switch;
the channel switch is disposed between and optically coupled to the photon pathway and the photon detector unit;
the photon detector unit comprises a plurality of photon detectors and a plurality of detector unit sub-channels, and a plurality of quantum memories;
the channel switch is actuatable between a plurality of optical engagement positions, and is capable of being positioned in optical engagement with a first detector unit sub-channel such that a first photon pulse subsequence comprising a first plurality of photon pulses each having a pulse sequence period is absorbed by a first quantum memory and the quantum bit information of each of the first plurality of photon pulses is thereafter released by the first quantum memory at a quantum memory period and received by a first photon detector; and
is capable of switching into optical engagement with a second detector unit sub-channel such that a second photon pulse sub-sequence comprising a second plurality of photons pulses having the pulse sequence period is absorbed by a second quantum memory and the quantum bit information of each of the second plurality of photon pulses is thereafter released by the second quantum memory at the quantum memory period and received by a second photon detector, wherein the quantum memory period is longer than the pulse sequence period.

2. The quantum key generation system of claim 1, wherein each photon detector of the photon detector unit is structurally configured to receive quantum bit information of a photon pulse output by the photon generator.

3. The quantum key generation system of claim 1, wherein at least one of the plurality of photon detectors of the photon detector unit comprises a single-photon detector.

4. The quantum key generation system of claim 3, wherein the single-photon detector comprises a superconducting nanowire single-photon detector, a carbon nanowire detector, an avalanche photodiode detector, or a low dark count photodiode.

5. The quantum key generation system according to claim 1, wherein at least one of the plurality of detector unit sub-channels comprises an optical fiber.

6. The quantum key generation system of claim 1, wherein each of the plurality of detector unit sub-channels comprise the same optical length.

7. A quantum key generation system comprising:
a photon generator structured to generate a photon pulse sequence comprising a plurality of photon pulse subsequences each comprising a plurality of photon pulses, a photon pathway, a channel switch, and a photon detector unit, wherein:
the photon pathway optically couples the photon generator and the channel switch;

the channel switch is disposed between and optically coupled to the photon pathway and the photon detector unit;

the photon detector unit comprises a plurality of photon detectors and a plurality of detector unit sub-channels;

the channel switch is actuatable between a plurality of optical engagement positions and each pair of temporally adjacent photon pulses of the photon pulse sequence are temporally spaced by a pulse spacing period;

the plurality of detector unit sub-channels comprises $N_D$ number of detector unit sub-channels, wherein $N_D > \tau_{dead} \times T_P$, $\tau_{dead}$ comprises a detector dead time of each of the plurality of photon detectors, and $T_P$ comprises the pulse spacing period.

8. A quantum key generation system comprising a photon generator, a photon pathway, a channel switch, and a photon detector unit, wherein:

the photon pathway optically couples the photon generator and the channel switch;

the channel switch is disposed between and optically coupled to the photon pathway and the photon detector unit;

the photon detector unit comprises a plurality of photon detectors and a plurality of detector unit sub-channels;

each detector unit sub-channel of the plurality of detector unit sub-channels optically couples the channel switch with an individual photon detector of the plurality of photon detectors;

the channel switch is actuatable between a plurality of optical engagement positions; and each optical engagement position of the channel switch optically couples the photon pathway with a photon detector of the plurality of photon detectors, wherein the photon detector unit comprises a plurality of quantum memories; and, wherein:

each detector unit sub-channel comprises an upstream segment and a downstream segment;

the upstream segment extends between the channel switch and an individual quantum memory of the plurality of quantum memories; and the downstream segment extends between the individual quantum memory of the plurality of quantum memories and an individual photon detector of the plurality of photon detectors.

9. The quantum key generation system of claim 8, wherein each quantum memory of the plurality of quantum memories is structurally configured to, upon receipt of a photon pulse, absorb the photon pulse thereby exciting an atomic ensemble state of the quantum memory from a first energy state into a second energy state and, upon return of the atomic ensemble state of the quantum memory to the first energy state, release a photon pulse comprising the quantum bit information of the received photon pulse.

10. The quantum key of claim 8, wherein the channel switch comprises an optical switch.

11. A method of communicating information, the method comprising:

generating a photon pulse sequence comprising a plurality of photon pulses using a photon generator, wherein:

the photon generator is optically coupled to a channel switch by a photon pathway;

the channel switch is disposed between and optically coupled to the photon pathway and a photon detector unit, the photon detector unit comprising a plurality of photon detectors and a plurality of detector unit sub-channels;

each detector unit sub-channel of the plurality of detector unit sub-channels optically couples the channel switch with an individual photon detector of the plurality of photon detectors;

the channel switch is actuatable between a plurality of optical engagement positions; and each optical engagement position of the channel switch optically couples the photon pathway with a detector unit sub-channel of the plurality of detector unit sub-channels; and switching the optical engagement position of the channel switch such that temporally adjacent photon pulses of the photon pulse sequence are output into different detector unit sub-channels of the plurality of detector unit sub-channels, wherein:

the channel switch switches between optical entanglement positions in a switching period;

each pair of temporally adjacent photon pulses of the photon pulse sequence are temporally spaced by a pulse spacing period; and each pair of temporally adjacent photon pulses of the photon pulse sequence are temporally spaced by a pulse spacing period; and the switching period is less than the pulse spacing period.

12. The method of claim 11, wherein the plurality of photon pulses each comprise quantum bit information and temporally adjacent photon pulses of the photon pulse sequence are output into different detector unit sub-channels such that the quantum bit information of the temporally adjacent photon pulses are received by different photon detectors of the plurality of photon detectors.

13. The method of claim 12, herein the quantum bit information comprises a linear polarization, a circular polarization, elliptical polarization, translational momentum, orbital angular momentum, phase, or a combination thereof.

14. The method of claim 11, wherein at least one of the plurality of photon detectors of the photon detector unit comprises a superconducting nanowire single-photon detector, a carbon nanowire detector, an avalanche photodiode detector, or a low dark count photodiode.

15. A quantum key generation system comprising:

a photon generator structured to generate a photon pulse sequence comprising a plurality of photon pulse sub-sequences each comprising a plurality of photon pulses, a photon pathway, a channel switch, and a photon detector unit, wherein:

the photon pathway optically couples the photon generator and the channel switch;

the channel switch is disposed between and optically coupled to the photon pathway and the photon detector unit;

the photon detector unit comprises a plurality of photon detectors and a plurality of detector unit sub-channels;

the the channel switch is structured to switch between optical entanglement positions in a switching period such that each pair of temporally adjacent photon pulses of the photon pulse sequence are temporally spaced by a pulse spacing period; and the switching period is less than the pulse spacing period.

16. A method of communicating information, the method comprising:

generating a photon pulse sequence comprising a plurality of photon pulses using a photon generator, wherein:

the photon generator is optically coupled to a channel switch by a photon pathway;

the channel switch is disposed between and optically coupled to the photon pathway and a photon detector unit, the photon detector unit comprising a plurality of photon detectors and a plurality of detector unit sub-channels;

each detector unit sub-channel of the plurality of detector unit sub-channels optically couples the channel switch with an individual photon detector of the plurality of photon detectors;

the channel switch is actuatable between a plurality of optical engagement positions; and each optical engagement position of the channel switch optically couples the photon pathway with a detector unit sub-channel of the plurality of detector unit sub-channels; and switching the optical engagement position of the channel switch such that temporally adjacent photon pulses of the photon pulse sequence are output into different detector unit sub-channels of the plurality of detector unit sub-channels, wherein:

wherein:

each pair of temporally adjacent photon pulses of the photon pulse sequence are temporally spaced by a pulse spacing period;

the plurality of detector unit sub-channels comprises $N_D$ number of detector unit sub-channels, wherein $N_D > \tau_{dead} \times T_P$, $\tau_{dead}$ comprises a detector dead time of each of the plurality of photon detectors, and $T_P$ comprises the pulse spacing period.

17. A method of communicating information, the method comprising:

generating a photon pulse sequence using a photon generator, wherein:

the photon pulse sequence comprises a plurality of photon pulse sub-sequences each comprising a plurality of photon pulses, the plurality of photon pulses each comprising quantum bit information;

the photon generator is optically coupled to a channel switch by a photon pathway;

the channel switch is disposed between and optically coupled to the photon pathway and a photon detector unit, the photon detector unit comprising a plurality of photon detectors, a plurality of detector unit sub-channels, and a plurality of quantum memories;

the channel switch is actuatable between a plurality of optical engagement positions; and the channel switch is positioned in optical engagement with a first detector unit sub-channel such that a first photon pulse sub-sequence comprising a first plurality of photon pulses each having a pulse sequence period is absorbed by a first quantum memory and the quantum bit information of each of the first plurality of photon pulses is thereafter released by the first quantum memory at a quantum memory period and received by a first photon detector; and switching the channel switch into optical engagement with a second detector unit sub-channel such that a second photon pulse sub-sequence comprising a second plurality of photons pulses having the pulse sequence period is absorbed by a second quantum memory and the quantum bit information of each of the second plurality of photon pulses is thereafter released by the second quantum memory at the quantum memory period and received by a second photon detector, wherein the quantum memory period is longer than the pulse sequence period.

18. The method of claim 17, wherein each optical engagement position of the channel switch optically couples the photon pathway with an individual quantum memory of the plurality of quantum memories.

19. The method of claim 17, wherein each detector unit sub-channel comprises an upstream segment extending between the channel switch and an individual quantum memory of the plurality of quantum memories and a downstream segment extending between the individual quantum memory of the plurality of quantum memories and an individual photon detector of the plurality of photon detectors.

20. The method of claim 17, wherein each quantum memory of the plurality of quantum memories is structurally configured to, upon receipt of a photon pulse, absorb the photon pulse thereby exciting an atomic ensemble state of the quantum memory from a first energy state into a second energy state and, upon return of the atomic ensemble state of the quantum memory to the first energy state, release a photon pulse comprising the quantum bit information of the received photon pulse.

* * * * *

UNITED STATES PATENT AND TRADEMARK OFFICE
CERTIFICATE OF CORRECTION

PATENT NO. : 11,290,192 B2
APPLICATION NO. : 16/967291
DATED : March 29, 2022
INVENTOR(S) : Nikolay Alekseyevich Kaliteevskiy et al.

Page 1 of 1

It is certified that error appears in the above-identified patent and that said Letters Patent is hereby corrected as shown below:

In the Claims

In Column 14, Line 57, in Claim 15, after "sub-channels;" delete "the".

In Column 15, Line 23, in Claim 16, after "wherein:" delete "wherein:".

Signed and Sealed this
Twenty-eighth Day of June, 2022

Katherine Kelly Vidal
*Director of the United States Patent and Trademark Office*